Figure 1:
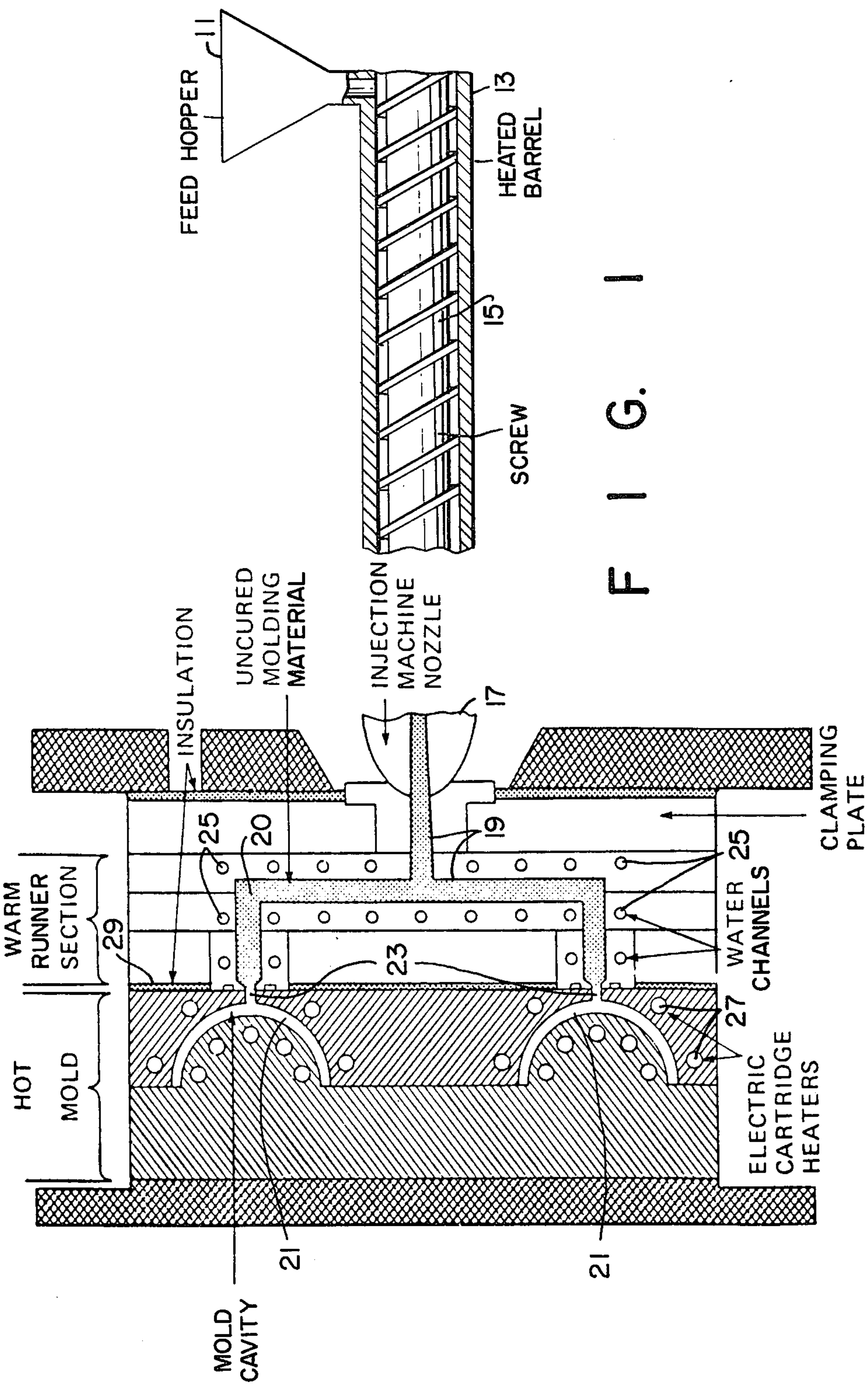

United States Patent [19]

Sauers

[11] 3,959,433

[45] May 25, 1976

[54] METHOD OF WARM RUNNER INJECTION MOLDING PHENOLIC RESINS WITH PARA-SUBSTITUTED PHENOL

[75] Inventor: Marvin Edward Sauers, Belle Mead, N.J.

[73] Assignee: Union Carbide Corporation, New York, N.Y.

[22] Filed: Sept. 6, 1974

[21] Appl. No.: 503,688

[52] U.S. Cl. .......................... 264/328; 260/33.4 P; 264/329

[51] Int. Cl.² ........................................ B29G 3/00

[58] Field of Search ........... 264/328, 329; 260/51 R, 260/53 R, 54, 59, 838, 33.4 P, 67 FP, 59

[56] References Cited

UNITED STATES PATENTS

| | | | |
|---|---|---|---|
| 2,736,718 | 2/1956 | Webber | 260/53 |
| 2,809,178 | 10/1957 | Turner et al. | 260/59 |
| 2,970,121 | 1/1961 | Schmittberger | 260/59 |
| 3,299,167 | 1/1967 | Knowlson et al. | 260/838 |
| 3,351,605 | 11/1967 | Harvey | 260/57 R |
| 3,660,552 | 5/1972 | Hinz et al. | 264/328 |
| 3,812,228 | 5/1974 | Skoroszewski | 264/329 |

OTHER PUBLICATIONS

Randolph et al., Plastics Engineering Handbook, Reinhold, N.Y. (1965) pp. 36 and 37.

*Primary Examiner*—Willard E. Hoag
*Attorney, Agent, or Firm*—Charles J. Metz

[57] ABSTRACT

There is disclosed a thermosetting phenolic resin composition, suitable for use in injection molding, which resin composition contains a molding grade phenolic resin and an effective amount of a reactive compound (e.g., para-t-butylphenol) that is capable of reducing the viscosity of molding compositions containing said phenolic resin composition to a processable viscosity at a temperature at which the period of time within which said molding composition cures to a thermoset state is longer than the period of time that said molding composition is in the runner during a normal injection molding operation. There is also disclosed molding compositions containing said phenolic resin composition, and an injection molding process utilizing the same.

7 Claims, 3 Drawing Figures

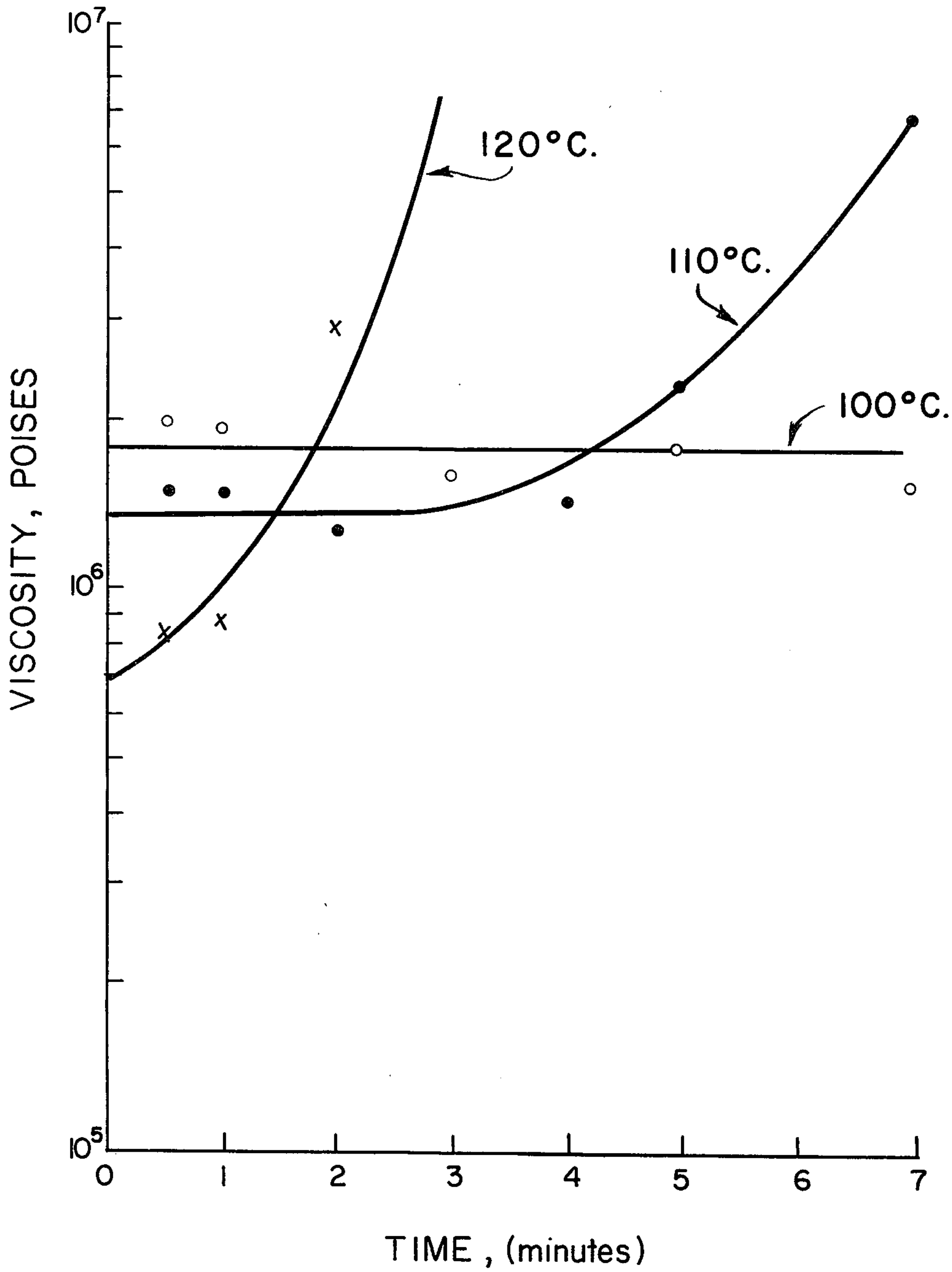
F I G. 3

METHOD OF WARM RUNNER INJECTION MOLDING PHENOLIC RESINS WITH PARA-SUBSTITUTED PHENOL

The invention relates to phenolic resins suitable for use in warm runner injection molding compositions, to warm runner injection molding compositions containing said resins, and to a warm runner injection molding process utilizing same.

One of the newest processes for the fabrication of parts from phenolic molding compositions is injection molding. This technique offers the advantage of fast cycles and better control of molding variables, when compared with the more standard techniques of compression and transfer molding. Its major disadvantage, especially when molding with multi-cavity molds, is that there can be a large amount of scrap generated in the runner system. With a thermosetting material, this scrap cannot be reused. Recently, a new technique that is known as "warm runner molding" has been introduced for use in injection molding. In the warm runner molding technique, the molding material stays molten in the runner of the injection molding apparatus, but it does not cure in the runner under normal operations. It is then injected into the hot mold cavity by the next charge of material. The amount of scrap generated is greatly reduced because the material in the runner is not lost.

In order to be used successfully in the warm runner system, thermosetting compositions should have a number of properties. First, at the temperatures found in the runner, the molding composition should be a fluid of low enough viscosity to be processable in the runner system, but yet should not cure so fast at the temperatures prevalent therein that it advances to a thermoset state therein. However, once injected into the mold cavity, the molding composition should be capable of fast cure rates. Further, the final properties of the molded article made from such molding compositions should not be significantly less desirable than those articles molded from conventional molding compositions.

In accordance with the present invention, a thermosetting phenolic resin composition, suitable for use in warm runner injection molding, is provided. The resin composition is a molding grade phenolic resin which contains an effective amount of a reactive compound that is capable of reducing the viscosity of molding compositions containing said resin composition to a processable viscosity at a temperature at which the period of time within which said molding composition cures to a thermoset state is longer than the period of time that said molding composition is in the runner during a normal injection molding operation. The invention also provides molding compositions containing said phenolic resin composition, and an injection molding process utilizing the same.

Injection Molding

A molding process wherein the molding material, in a melted or plasticized state, is injected into a mold cavity. Typically, cold molding composition is fed from a hopper into a heated cylinder containing a screw. The molding composition is heated, melted and plasticized in the screw flights, and then the screw, acting as a ram, injects the melted and plasticized material into the mold cavity;

Molding grade phenolic resin

A phenolic resin, either a resole or a novolak, that is solid at room temperature, that is thermosetting when subjected to elevated temperatures (it may be thermosetting per se, as resoles are, or when mixed with a reactive cross-linking agent such as hexamethylenetetramine, as novolaks are), and which is suitable for use in injection molding. The special characteristics of molding grade phenolic resins will be discussed more fully below;

Molding Composition

A material, ordinarily comminuted, containing a molding grade phenolic resin, cross-linking agent such as hexamethylenetetramine when required, fillers, and the like, and which is employed in molding applications. Molding compositions will be discussed more fully below;

Processable viscosity

A molding composition, as defined herein, is said to be of processable viscosity when the phenolic resin, and other fusible constituents if any, have fused and are at a low enough viscosity so that the molding composition can flow in the runner system of an injection molding apparatus and fill the mold cavity, under the conditions of temperature and pressure available in the molding apparatus;

Runner

The term "runner" is intended to include the entire conduit system that the molding composition passes through between the mixing and/or fusing zone (e.g., the heated screw of an extruder) of an injection molding apparatus, at one end, and the hot mold section, at the other; and Thermoset state A molding composition has reached the thermoset state when sufficient cross-linking has taken place that it is no longer effectively moldable. In most cases, the molding composition is no longer effectively moldable when it is no longer fusible under the conditions of heat and pressure available in the mold.

Figure 2:
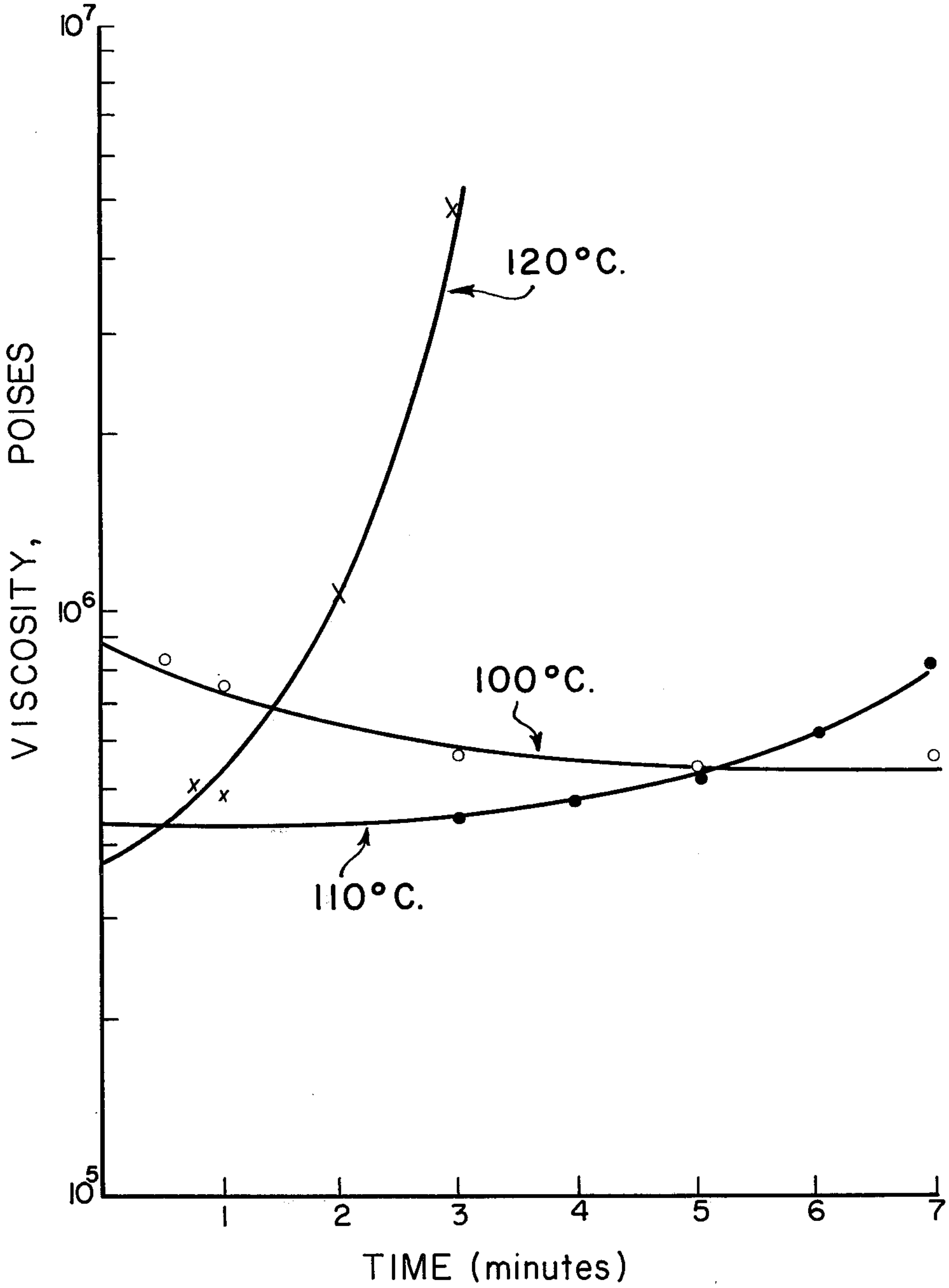

The understanding of the invention is facilitated by reference to the accompanying drawings, wherein:

FIG. 1 is a cross-sectional, partially schematic view of an injection molding apparatus adapted to carry out a warm runner injection molding process; and FIGS. 2 and 3 are graphs of time versus viscosity at several temperatures for a warm runner, phenolic resin-based molding composition of the invention (FIG. 2), and a conventional phenolic resin-based molding composition.

Referring now to FIG. 1, a typical operation of a warm runner injection molding operation is the following:

Molding material is fed into a feed hopper 11, and from there into a fusing and plasticizing zone, such as the interior of a heated barrel 13 containing a screw 15. The molding material is fused and plasticized by the heat from the barrel 13 and by the mechanical working caused by the rotation of the screw 15. A predetermined quantity of fused and plasticized molding material is injected by the screw 15, acting as a ram, through the injection nozzle 17 into the runner system 19 of the apparatus. The injection of said predetermined quantity of fused and plasticized molding material into the runner system 19, serves to force the uncured fused and plasticized molding material 20 already in the runner system 19 into the mold cavity 21. Pressure is maintained by the screw 15 long enough for the material that has been injected into the mold cavity 21 to cure, and then the screw 15 is rotated backwards, thereby relieving the pressure on the material in the mold cavity 21 and, at the same time, plasticizing and fusing the molding material in the barrel 13 so that it is ready for the next cycle. The mold is opened and the molded article is removed from the mold cavity 21 after the screw 15 has finished its backward motion.

In the warm runner injection molding process, the only scrap generated is that small portion of molding material contained in the passage shown in FIG. 1 as 23, which is contained in the hot mold section of the apparatus.

The temperature of the barrel 13 is usually maintained within the range of from about 130° to about 210°F. The warm runner section of the apparatus is usually maintained at a temperature within the range of from about 180° to about 250°F., and preferably from about 200° to about 220°F., by conventional means such as by circulating hot water through channels 25. The mold cavity 21 is usually maintained at a temperature of from about 330° to about 400°F., by conventional heating means such as electric cartridge heaters 27. There is preferably a layer of heat insulating material 29 between the hot mold section and the warm runner section.

The pressure in the runner system 19 during injection and holding is usually of the order of about 5000 to about 20,000 pounds per square inch. Typical curing or holding times in the mold cavity are within the range of from about 10 seconds to about 90 seconds, depending upon the geometry and size of the part being molded. Residence time of the uncured molding material 20 in the runner system 19 can range from about 1 up to about 10 cycles of operation, although where the longer cure times are employed, the runner system is preferably designed so that the uncured molding material 20 remains in the runner system 19 for not more than about 8 minutes.

In a convention injection molding operation, the runner system is maintained at the same temperature as the mold cavity. Therefore, all the material in the runner system becomes scrap in each cycle, instead of the relatively smaller amount of scrap generated in the warm runner method.

The phenolic resins that are employed in the invention are molding grade phenolic resoles or novolaks. Such molding grade phenolic resins are well known in the art. Briefly, molding grade phenolic resins are solids at room temperature, they are grindable by conventional procedures, and they have medium viscosity when fused at compounding and molding temperatures. Molding grade resoles are normally base-catalyzed resins having a formaldehyde factor (i.e., parts, by weight, of 40 weight per cent aqueous formaldehyde per 100 parts by weight of unsubstituted phenol) of the order of about 90 to about 180. Molding grade novolaks are normally acid-catalyzed resins having a formaldehyde factor of the order of about 50 to about 75.

Ordinarily, molding grade phenolic resins are produced from unsubstituted phenol and formaldehyde. However, other phenols and aldehydes can be employed. Specific illustrative examples include cresols, bisphenol-A, and furfuraldehyde. Of course, when using materials, such as bisphenol-A and furfuraldehyde, whose functionalities differ from unsubstituted phenol and formaldehyde, the proportions of phenol and aldehyde will vary in a known manner from the representative proportions set forth above.

The above-described phenolic resins are employed in molding compositions or materials. Conventional phenolic resin-based molding compositions are employed in the invention. Phenolic resin-based molding compositions ordinarily contain from about 30 to about 55, and preferably from about 40 to about 45, weight per cent of molding grade phenolic resin. (As used here, "phenolic resin" means either resole or novolak plus hexamethylenetetramine.) The other materials that are employed in molding compositions include one or more of fillers, extenders, toughening agents, pigments, lubricants, reinforcing agents, and the like. The following Table displays representative materials that are commonly employed, in various combinations, in phenolic resin-based molding materials, and their usual range of proportions:

TABLE I

| Component | Proportion, Parts, by weight per 100 parts of resole or novolak |
|---|---|
| Hexamethylenetetramine | 20 – 30 |
| Wood flour | 10 – 60 |
| Asbestos | 10 – 40 |
| Mica | 10 – 40 |
| Lime | 5 – 20 |
| Talc | 5 – 30 |
| Cotton Flock | 5 – 30 |
| Carbon Filler | 5 – 30 |
| Pigments | 2.5 – 5 |
| Zinc Oxide | 5 – 40 |
| Barium Sulfate | 5 – 40 |
| Silica | 10 – 40 |
| Glass Fiber | 10 – 40 |
| Calcium Stearate (lubricant) | About 1 |

The principal novelty of this invention resides in the use of an additive material in otherwise conventional phenolic resin-based molding compositions. This additive is a reactive compound that is capable of reducing the viscosity of phenolic resin-based molding compositions such that the molding composition will have a processable viscosity at a temperature at which the cure rate is slow enough so that the composition can be maintained at that temperature without advancing to a thermoset state during the period of time that the molding composition is normally present in the runner during a warm runner injection molding operation. (By the term "reactive compound" is meant a compound that is capable of reacting with the molding composition during a conventional cure cycle.) Such reactive compounds include phenolic compounds that have melting points within the range of from about 35° to about 160°C. Preferably, the reactive compound is a phenolic compound that has at least two positions on the benzene ring that are reactive with the phenolic resole or novolak that is employed in the molding composition. Specific examples of such phenolic compounds include p-ethylphenol, p-isopropylphenol, p-t-butylphenol, p-cumylphenol, para-phenylphenol, styrenated phenol, para-cyclo-hexylphenol, para-cyclohexenylphenol, bisphenol-A, and beta-naphthol. Of these phenolic materials, p-t-butylphenol and p-cumylphenol have performed best in the invention.

The preferred class of reactive compounds are para-substituted phenols wherein the para substituent is alkyl, cycloalkyl, cycloalkenyl, phenyl, alkylphenyl, or hydroxyphenylalkyl, having melting points within the above-indicated range of from about 35° to about 160°C. (The melting point range applies to the compounds in the substantially pure state. When used in mixtures, the mixtures may have much lower melting points.)

The reactive compound is employed in the phenolic resin composition of the invention in an effective amount so that when the molding grade phenolic resin is employed in a molding composition, the said molding composition has a processable viscosity at a temperature low enough so that the cure rate is such that the molding composition does not advance to a thermoset state in the runner during a normal warm runner injection molding operation. While the exact amount selected will vary, depending upon the specific nature of the phenolic resin, the reactive compound additive, and the temperature in the runner, effective amounts have been found within the range of from about 5 to about 35, and preferably from about 10 to about 15, parts by weight, per 100 parts by weight of resole or novolak (excluding hexa) employed.

The reactive compound additive can be added to the phenolic resin after the resin is produced, or it can be added to the molding composition when the phenolic resin is also being added to the molding composition. The molding compositions are produced in the usual manner, except for the addition of the reactive compound additive.

The following Examples illustrate the invention:

EXAMPLE 1

A molding composition was produced from the following components:

| | Parts, by Weight |
|---|---|
| Novolak A[1] | 44 |
| Hexamethylenetetramine | 9 |
| Fillers and pigments | 42 |
| p-t-butylphenol | 5 |

[1] A commercial, general purpose molding grade novolak made by the acid catalyzed reaction of 87 parts by weight of phenol and 57 parts by weight of formaldehyde, as formalin.

The components were compounded on a two-roll mill at 85°C. for 60 seconds, sheeted off, and granulated. The granulated molding material was fed into the hopper of a warm runner injection molding machine similar to the one shown in FIG. 1. The rear zone of the barrel (the first 18 inches from the hopper) was maintained at a temperature of 150°F. The front zone of the barrel (the next 20 inches) and the injection nozzle were maintained at a temperature of 190°F. The temperature of the fused and plasticized molding material as it came out of the injection nozzle was about 200°F.

The molding material was injected into a warm runner, four-cavity ash tray mold. The water in the warm runner section was maintained at 220°F. The surface temperature in the mold cavities was 360°F.

A typical molding cycle was the following:

10 second injection time, with the screw acting as a ram to force the molding material into the mold cavities;

25 second holding time in the mold cavities; and 19 seconds for the screw to rotate backward to relieve the pressure on the mold cavity and to fuse and plasticize the next charge of material.

The mold is then opened, the four molded ash trays are removed, the mold is closed, and the cycle is repeated. The injection pressure on the molding material was about 11,000 psi and the holding pressure was about 10,000 psi.

Each ash tray weighed 70 grams. There was only 1 gram of scrap material per ash tray. There would have been about 15 grams of scrap per ash tray if the material in the runner system had cured during each cycle.

The above-described molding cycle has been carried out for several hours (an 8-hour working day), with no need to shut down because of plugging or fouling of the runner system. If it were attempted to carry out the same molding operation under the same conditions with the same molding material, but omitting the p-t-butylphenol from the formulation, only about 20 cycles could have been completed before the machine would have to be shut down because of plugged or fouled runners.

The properties of cured molded articles are not changed substantially by the presence of p-t-butylphenol in the formulation. Tensile bars were injection molded from the above-described formulation, both with and without* p-t-butylphenol. The properties of the cured tensile bars were as shown below in Table II.

*The formulation without p-t-butylphenol was the following:

| | Parts, by weight |
|---|---|
| Novolak A | 49 |
| Hexamethylenetetramine | 9 |
| Fillers and pigments | 42 |

TABLE II

PROPERTIES COMPARISON

| Property | Without p-t-butylphenol | With p-t-butylphenol |
|---|---|---|
| Tensile Strength (psi) | 7,350 | 7,000 |
| Flexural Strength (psi) | 14,100 | 12,380 |
| Modulus of Elasticity (psi × $10^6$) | 1.07 | 0.97 |
| Compressive Strength (psi) | 32,700 | 32,000 |
| Izod Impact Strength (Ft.lb./in.) | 0.29 | 0.32 |
| Specific Gravity | 1.38 – 1.42 | 1.37 |
| Heat Deflection Temp. at 264 psi (°F.) | 375 | 365 |
| Water Absorption (%) | 0.28 | 0.22 |
| Dielectric Strength, Volts/Mil | 238 | 233 |
| Volume Resistivity, Ohm-Cm | $0.9 \times 10^{10}$ | $1 \times 10^{10}$ |
| Dielectric Constant | | |
| 60 $H_z$ | 18.8 | 22.8 |
| $10^3$ $H_z$ | 10.1 | 11.2 |
| $10^6$ $H_z$ | 5.8 | 5.9 |
| Dissipation Factor | | |
| 60 $H_z$ | 0.81 | 0.83 |
| $10^3$ $H_z$ | 0.33 | 0.39 |
| $10^6$ $H_z$ | 0.06 | 0.08 |

EXAMPLE 2

A resole-based warm runner injection molding composition was produced from the following components:

| Component | Parts, by Weight |
|---|---|
| Resole A[2] | 44 |
| Fillers and Pigments | 52 |
| p-t-butylphenol | 4 |

[2] Resole A is a lime-catalyzed, 129 factor, phenol/formaldehyde resin.

The compounding, granulating, and molding procedures were all the same as described above in Example 1. All the temperatures were also the same.

The cycle employed was the following:

10 second injection time;

58 second holding time in the mold cavity; and 18 seconds to rotate the screw back.

The pressure on the molding material was about 10,000 psi during both injection and holding.

Under the above-described conditions, the molding cycles were carried out for several hours, with no sign of fouling or plugging of the runner system. Without the p-t-butylphenol in the formulation, probably only 10 cycles could have been completed before shut-down would have been required because of plugging or fouling of the runner system.

EXAMPLE 3

The viscosity (in centipoises) versus time at three different temperatures (100°, 110°, and 120°C.) was measured at a shear rate of 0.07 $second^{-1}$ in a Wissenberg Rheometer, for the two novolak-based molding materials described above in Example 1. The results for the material containing p-t-butylphenol are displayed in FIG. 2, and for the same material but without p-t-butylphenol in FIG. 3.

At 100°C., the conventional molding material had a viscosity more than twice that of the material containing p-t-butylphenol. After three minutes, the viscosity difference was about threefold. At 110°C., the viscosity difference is about threefold, and after four minutes, the viscosity of the conventional material is increasing rapidly, while that of the p-t-butylphenol-containing material is not. At 125°C., the viscosity increase rates are about the same, although the p-t-butylphenol-containing material has a lower initial viscosity. The similar rates of viscosity increase at this temperature indicates similar cure rates at molding temperatures.

What is claimed is:

1. In an injection molding process wherein a molding composition is fused and plasticized in injection means, wherein the fused and plasticized molding composition is injected through a runner system into a mold cavity, and wherein the runner system is maintained at a temperature at which the period of time within which said molding composition cures to a thermoset state is longer than the normal residence time of said molding composition in said runner system during said injection molding process, the improvement which comprises employing as said molding composition a composition suitable for use in injection molding, and which contains a phenolic resin composition comprising (a) a molding grade phenolic resin, and (b) an effective amount of a reactive phenolic compound that is capable of reducing the viscosity of molding compositions containing said molding grade phenolic resin to a processable viscosity at a temperature at which the period of time within which said molding composition cures to a thermoset state is longer than the period of time that said molding composition is in the runner during a normal injection molding operation, wherein said molding composition is adapted for use in an injection molding operation wherein the molding composition is fused and plasticized in injection means, and is injected by said injection means into a mold cavity through a runner which connects said injection means with said mold cavity, wherein said reactive phenolic compound is a compound having a melting point within the range of from about 35° to about 160°C., wherein said reactive phenolic compound is a parasubstituted phenol wherein the para substituent is alkyl, cycloalkyl, cycloalkenyl, phenyl, alkylphenyl, or hydroxyphenylalkyl, and wherein said reactive phenolic compound is employed in an amount within the range of from about 5 to about 35 parts by weight, per 100 parts of said molding grade phenolic resin.

2. The process of claim 1 wherein the reactive phenolic compound is p-t-butylphenol.

3. The process of claim 1 wherein the reactive phenolic compound is p-cumylphenol.

4. The process of claim 1 wherein the reactive phenolic compound is at least one member of the group consisting of p-ethylphenol, p-isopropylphenol, p-t-butylphenol, p-cumylphenol, para-phenylphenol, styrenated phenol, para-cyclohexylphenol, para-cyclohexenylphenol, bisphenol-A, and beta-naphthol.

5. The process of claim 1 wherein the phenolic resin is a resole.

6. The process of claim 1 wherein the phenolic resin is a novolak.

7. The process of claim 6 wherein the reactive phenolic compound is employed in an amount within the range of from about 10 to about 15 parts by weight per 100 parts by weight of said novolak.

* * * * *